United States Patent
Mashimo (10) Patent No.: US 7,483,354 B2
(45) Date of Patent: Jan. 27, 2009

(54) OPTICAL DISK APPARATUS FOR RECORDING DATA ON MULTILAYER OPTICAL DISK

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 594 days.

(21) Appl. No.: 11/313,510

(22) Filed: Dec. 20, 2005

(65) Prior Publication Data

US 2006/0140085 A1    Jun. 29, 2006

(30) Foreign Application Priority Data

Dec. 24, 2004   (JP) ............................. 2004-373594

(51) Int. Cl.
   *G11B 7/00*   (2006.01)
(52) U.S. Cl. .................. 369/47.53; 369/94; 369/47.51; 369/53.27
(58) Field of Classification Search ............. 369/47.51, 369/47.53, 47.5, 94, 116, 53.22, 53, 27
See application file for complete search history.

(56) References Cited

U.S. PATENT DOCUMENTS

| | | | |
|---|---|---|---|
| 6,893,698 B2 * | 5/2005 | Narumi et al. ............. 428/64.1 |
| 7,245,570 B2 * | 7/2007 | Kurokawa et al. ........ 369/47.53 |
| 7,385,891 B2 * | 6/2008 | Lee et al. ...................... 369/94 |
| 7,426,173 B2 * | 9/2008 | Maegawa ................ 369/30.11 |
| 2002/0136122 A1 * | 9/2002 | Nakano .................... 369/47.53 |
| 2002/0172113 A1 * | 11/2002 | Hirokane et al. ......... 369/47.51 |
| 2004/0085874 A1 | 5/2004 | Akiyama et al. |
| 2004/0120241 A1 * | 6/2004 | Kobayashi et al. ............ 369/94 |

FOREIGN PATENT DOCUMENTS

| | | |
|---|---|---|
| JP | 3-157816 A | 7/1991 |
| JP | 2000-048359 A | 2/2000 |
| JP | 2002-279634 | 9/2002 |
| JP | 2003-16648 | 1/2003 |
| JP | 2004-171740 | 6/2004 |
| JP | 2004-280962 A | 10/2004 |

* cited by examiner

*Primary Examiner*—Thang V Tran
(74) *Attorney, Agent, or Firm*—Christensen O'Connor Johnson Kindness PLLC (57) ABSTRACT

When recording data on a multilayer optical disk, the recording power for a recording layer provided further from the laser beam incident side is optimized. An optical disk includes a first layer and a second layer. When recording data onto the second layer, the amount of return light at the space forming time is detected, and whether the first layer is in an unrecorded state or in a recorded state is determined in accordance with the level of the amount of return light. Then, the recording power for the second layer is changed in accordance with the determination result regarding the unrecorded/recorded state of the first layer. If the transmittance of the first layer decreases as a result of data recording, the recording power for the second layer in a case where the first layer is in the recorded state is set greater than the recording power for the second layer in a case where the first layer is in the unrecorded state. Because the recording power is changed in accordance with the determination result regarding the state of the first layer, the order of recording data in the first layer and the second layer can be set as desired.

14 Claims, 4 Drawing Sheets

Related Art

Fig. 5

OPTICAL DISK APPARATUS FOR RECORDING DATA ON MULTILAYER OPTICAL DISK

BACKGROUND OF THE INVENTION

1. Field of the Invention

The present invention relates to an optical disk apparatus, and more particularly to recording power adjustment for an optical disk when data recording with respect to a multilayer optical disk having a plurality of recording layers is performed.

2. Description of Related Art

Conventionally, multilayer optical disks having recording layers stacked in a multilayered form have been developed for the purpose of increasing storage capacity. In these multilayer optical disks, optimization of the recording power is required for each layer, and test writing of data is performed with respect to a test area provided for each layer to thereby select the optimum recording power.

On the other hand, optical disks in which a high power laser beam is irradiated onto a recording film in a crystalline state to cause the recording film to transit to an amorphous state for recording data, for example, suffer from a problem that, due to different light transmittances of the recording film between the amorphous state and the crystalline state, the recording state of a recording layer formed on the front side (a recording layer which is provided closer to the laser beam incident side) affects the data recording onto a recording layer on the back side (a recording layer which is provided further from the laser beam incident side). More specifically, if the recording layer on the front side is in a data recorded state, the transmittance of that recording layer is decreased. Therefore, in this case, the amount of laser beam reaching the recording layer on the back side is decreased compared to that when the recording layer on the front side is in a data unrecorded state. Consequently, the optimum recording power which is obtained with the recording layer on the front side in an unrecorded state is not sufficient.

In order to solve the above problem, Japanese Patent Laid-Open Publication No. 2004-171740 describes a technique in which a correction coefficient has been recorded on the recording layer on the back side in advance, and data is first recorded on the layer on the front side. When recording data on the recording layer on the back side, the correction coefficient is used to correct the recording power.

Figure 5:
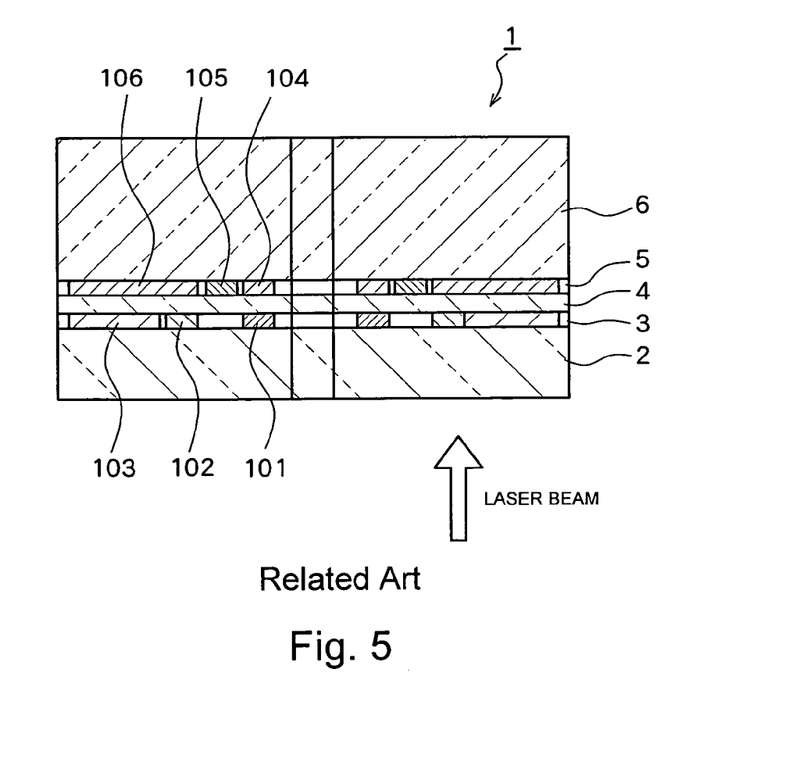
FIG. 5 is a diagram showing a structure of an optical disk of related art.

FIG. 5 shows a cross section of a multilayer optical disk 1 of the related art. The optical disk 1 includes a first recording layer 5 having a thickness of about 200 nm, a transparent separation layer 4 having a thickness of about 0.03mm, a second recording layer 3 having a thickness of about 100nm, and a protective layer 2, which are sequentially layered in this order on a polycarbonate substrate 6 having a thickness of about 1.1 mm. On the recording layers 3 and 5, an information track having a depth of about 20 nm and a width of about 0.2 µm is formed for tracking a laser beam at the time of recording and reproducing data. The laser beam is irradiated onto the optical disk from a surface on the side of the protective layer 2 as shown by an arrow in FIG. 5. Accordingly, data recording with respect to the first recording layer 5 is performed by the laser beam which has been transmitted through the second recording layer 3. The second recording layer 3 is formed by a material whose transmittance decreases by changing the state of the material from a crystalline state to an amorphous state by data recording. Correction information for correcting the laser beam intensity is recorded in a lead-in area 104 of the first recording layer 5. The correction information is a correction coefficient $\alpha$ used for correcting a decrease in the laser beam intensity caused by the decrease in the transmittance of the second recording layer 3 by data recording, and is determined as $\alpha = T1/T2$ wherein T1 is a transmittance of the second recording layer in a data unrecorded state and T2 is a transmittance of the second recording layer in a data recorded state.

With the above structure, when the apparatus is activated, the correction coefficient $\alpha$ which is recorded in the lead-in area 104 of the first recording layer 5 is first read out, and then data is recorded onto the second recording layer 3 which is a recording layer on the front side. Then, when recording data on the first recording layer 5, which is a recording layer on the back side, the second recording layer 3 is already in a recorded state. Accordingly, after the laser beam intensity is corrected using the correction coefficient, data is then recorded on the first recording layer 5.

In the related art structure described above, however, it is necessary to first record data on the recording layer on the front side and then record data on the recording layer on the back side, as a result of which the order of recording is limited. More specifically, with the above structure, it is not possible to satisfy the need a user may have to first record data on the recording layer on the back side, or to first record data on the recording layer on the front side and then record data on either the recording layer on the front side or the recording layer on the back side in a desired order.

In this respect, the above-described publication further describes that it is possible to record data on the first recording layer 5 regardless of whether or not data has been recorded on the second recording layer 3, by setting the correction coefficient $\alpha$ such that the quality of a reproduced signal obtained from data recorded on the first recording layer 5 using the corrected laser beam when the second recording layer 3 is in the unrecorded state can satisfy a predetermined criterion. Even with this structure, however, setting of the correction coefficient a is complicated, and there still remains a problem that data recording with the optimum recording power cannot be performed even if the correction coefficient $\alpha$ can be set as described above, which leaves a problem of deterioration of the reproduced signal quality unsolved.

SUMMARY OF THE INVENTION

The present invention provides an apparatus capable of recording data on a recording layer on the back side (which is provided further from the laser beam incident side of a disk) with an optimum recording power independently of the recording state of a recording layer on the front side (which is provided closer to the laser beam incident side of the disk).

In accordance with one aspect of the present invention, there is provided an optical disk apparatus for recording data on an optical disk having at least a first layer and a second layer, comprising detection means which detects an amount of return light at the time of forming a space in the second layer when data is to be recorded on the second layer by a laser beam which has been transmitted through the first layer; determination means which determines whether a portion of the first layer onto which the laser beam is irradiated is in an unrecorded state or in a recorded state, in accordance with a level of the amount of return light; and power control means which, in accordance with a determination result by the determination means, sets a recording power for recording data on the second layer to a first recording power if the first layer is in the unrecorded state and sets the recording power to a second recording power which differs from the first recording power if the first layer is in the recorded state.

In accordance with another aspect of the present invention, there is provided an optical disk apparatus for recording data on an optical disk having at least a first layer and a second layer, comprising detection means which detects an amount of return light at a time of forming a space in the second layer when data is to be recorded on the second layer by a laser beam which has been transmitted through the first layer; determination means which determines whether a portion of the first layer onto which the laser beam is irradiated is an unrecorded region, a recorded region, or a boundary region, in accordance with a level of the amount of return light; and power control means which, in accordance with a determination result by the determination means, sets a recording power for recording data on the second layer to a first recording power if the first layer is the unrecorded region, sets the recording power to a second recording power which differs from the first recording power if the first layer is the recorded region, and sets the recording power to a third recording power between the first recording power and the second recording power if the first layer is the boundary region.

According to the present invention, whether or not data has been recorded on the first layer is determined based on the amount of return light, and the recording power for the second layer is optimized in accordance with the determination result. It is therefore not necessary to first record data on the first layer to place the first layer in a recorded state and then record data on the second layer, as a result of which data can be recorded on the second layer in a desired order.

According to the present invention, data recording is performed with a recording power for an unrecorded state if the first layer is in an unrecorded state, and data recording is performed with a recording power for a recorded state if the first layer is in a recorded state. It is therefore possible to record data on the second layer in a desired order, such as data being recorded on the second layer prior to the data recording onto the first layer, or data being recorded on the second layer after the data recording onto the first layer, and so on. Further, because the recording power is controlled to be the optimum recording power in accordance with the state of the first layer, it is possible to assure high quality of a reproduced signal.

BRIEF DESCRIPTION OF THE DRAWINGS

A preferred embodiment of the present invention will be described in detail based on the following figures, wherein.

DESCRIPTION OF PREFERRED EMBODIMENT

A preferred embodiment of the present invention will be described in detail with reference to the accompanying drawings.

Figure 1:
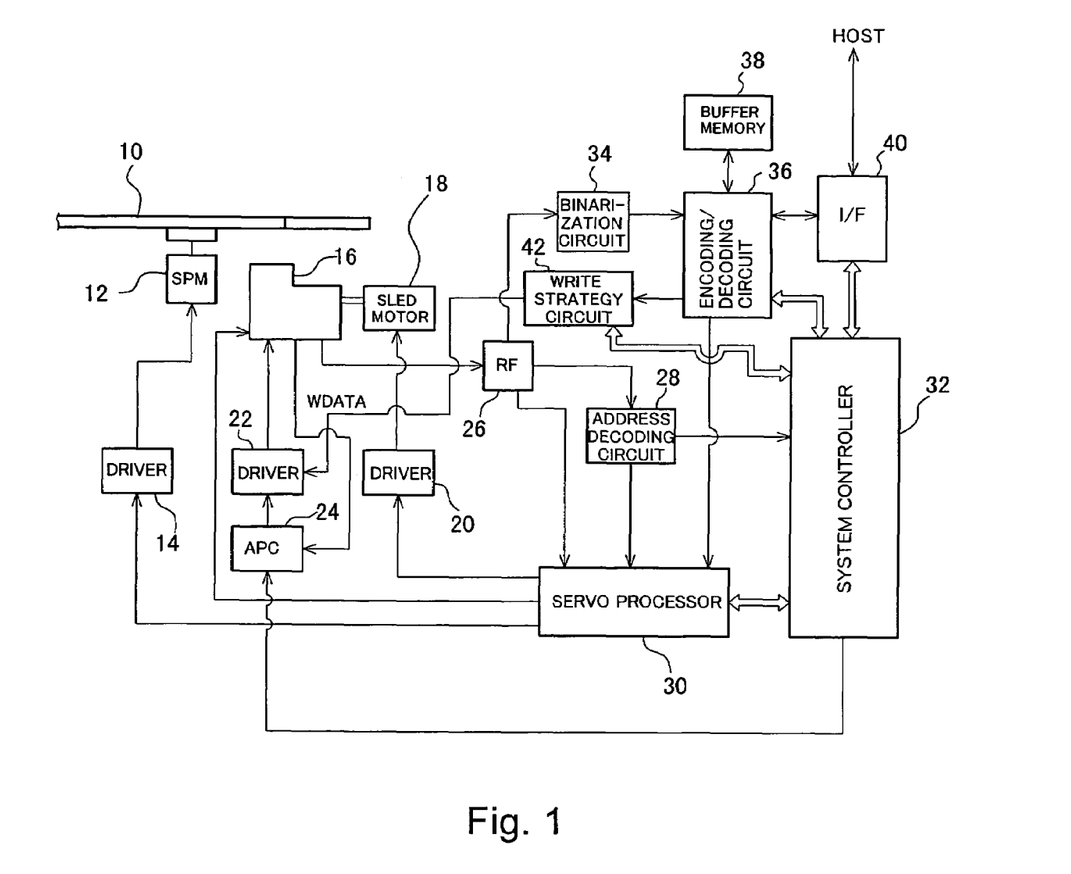
FIG. 1 is a diagram showing an overall structure of an optical disk apparatus according to an embodiment of the present invention.

FIG. 1 shows an overall structure of an optical disk apparatus according to the present embodiment. A recordable optical disk 10 such as DVD-R/RW or the like is driven to rotate by a spindle motor (SPM) 12. The optical disk 10, which has a multilayer structure similar to the conventional optical disk structure shown in FIG. 5, includes a first recording layer and a second recording layer. In the present embodiment, the recording layer formed on the front side as viewed from the laser beam incident surface (i.e. provided closer to the laser beam incident side) of the disk is referred to as the first recording layer and the recording layer formed on the back side as viewed from the laser beam incident surface (i.e. provided further from the laser beam incident side) of the disk is referred to as the second recording layer. The spindle motor SPM 12 is driven by a driver 14, which is servo-controlled by a servo processor 30 so as to operate at a desired rotation rate.

An optical pickup 16, which includes a laser diode (LD) for irradiating a laser beam onto the optical disk 10 and a photo detector (PD) for receiving and converting light reflected from the optical disk 10 into an electric signal, is disposed opposite the optical disk 10. The optical pickup 16 is driven by a sled motor 18 in the radial direction of the optical disk 10. The sled motor 18 is driven by a driver 20, which is servo-controlled by the servo processor 30 in the same manner as the driver 14. Further, the LD of the optical pick-up 16 is driven by a driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power in a stepwise manner, and then the test data is reproduced for evaluation of the signal quality, so that the recording power with which the desirable signal quality can be obtained is selected. As an index of signal quality, a β value and a γ value, a degree of modulation, jitter, or the like is used. When the recording layer of the optical disk is formed by first and second recording layers, the OPC is performed for each recording layer. With regard to the second recording layer provided on the back side, however, different recording powers are set depending on whether or not data has been recorded on the first recording layer (i.e. depending on whether the first recording layer is in a recorded state or an unrecorded state).

When reproducing the data recorded on the optical disk 10, a laser beam of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions. Further, the RF circuit 26 supplies an address signal contained in the reproduction signal to an address decoder 28. The address decoder 28 demodulates the address signal to obtain address data of the optical disk 10, and supplies the demodulated data to the servo processor 30 and a system controller 32. Further, the RF circuit 26 supplies a reproduction RF signal to a binarization circuit 34. The binarization circuit 34 binarizes (digitizes as binary data) the reproduced signal and supplies the resulting signal to be subjected to 8/16 (eight to sixteen) modulation to an encode/decode circuit 36. The encode/decode circuit applies 8/16 demodulation and error correction to the binarized signal to obtain reproduced data, and outputs the reproduced data to a host device such as a personal computer via an interface I/F 40. Here, the encode/decode circuit 36 temporarily stores the reproduced data in the buffer memory 38 before the data is output to the host device.

On the other hand, for recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as 8/16 modulation data, to a write strategy circuit 42. The write strategy circuit 42 converts the modulation data into multipulses (a pulse train) in accordance with a predetermined recording strategy, and supplies the multi-pulses, as recording data, to the driver 22. The recording strategy is constituted by pulse widths of a leading pulse or subsequent pulses in multipulses and the pulse duty, for example. The recording strategy, which affects recording quality, is generally fixed to a certain optimum strategy, and may be set during optimum power control (OPC). Then, the laser beam whose power was modulated according to the recording data is emitted from the LD of the optical pickup 16 onto the optical disk 10 for recording the data. Here, mark edge recording is employed in which data is recorded using a mark portion formed by irradiation of a laser beam of recording power and a length of a space portion onto which a laser beam other than that of a recording power (i.e. a laser beam of reproducing power and zero power, or erase power) is irradiated, namely by leading and trailing edge positions of the mark. After the data is recorded as described above, the optical pickup 16 emits a laser beam of reproducing power so as to reproduce the recorded data, and outputs the reproduced data to the RF circuit 26. The RF circuit 26 supplies the reproduced signal to the binarization circuit 34 where the data is binarized and subjected to 8/16 modulation and is supplied to the encode/decode circuit 36. The encode/decode circuit 36 decodes the 8/16 modulation data, and when decoding is not performed normally, performs an alternation operation. Specifically, the encode/decode circuit 36 records the recorded data which is stored in the buffer memory 38 in an alternation region. Whether the data is to be recorded the first recording layer or the second recording layer of the optical disk 10 is controlled by the system controller 32 based on an instruction from the host computer. Specifically, for recording data on the first layer on the front side, the lens of the optical pickup 16 is controlled to be driven such that a laser beam is focused on the first layer, and for recording data on the second layer on the back side, the lens of the optical pickup 16 is controlled to be driven such that the laser beam is focused on the second layer. Data recording onto the second recording layer is performed using the laser beam which has been transmitted through the first recording layer. The system controller 32 determines whether the data is to be recorded on the first recording layer or the second recording layer. The system controller 32, determining that data is to be recorded on the first recording layer, controls the APC 24 so as to record data with the optimum recording power which is set by the OPC. If the system controller 32 determines that data is to be recorded on the second recording layer, on the other hand, the system controller 32 further determines whether or not data has been recorded on the first recording layer and controls the APC 24 so as to change the recording power in accordance with the determination result.

The basic principle of recording power control at the time of data recording on the second recording layer according to the present embodiment will be described.

Figure 2A:
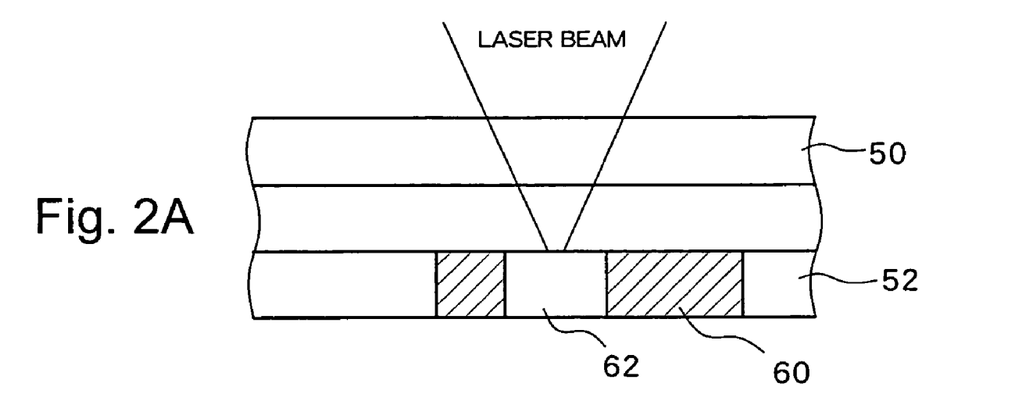
FIG. 2A is a view for explaining detection timing of an amount of return light at the time of data recording onto the second layer with the first layer in an unrecorded state.
Figure 2B:
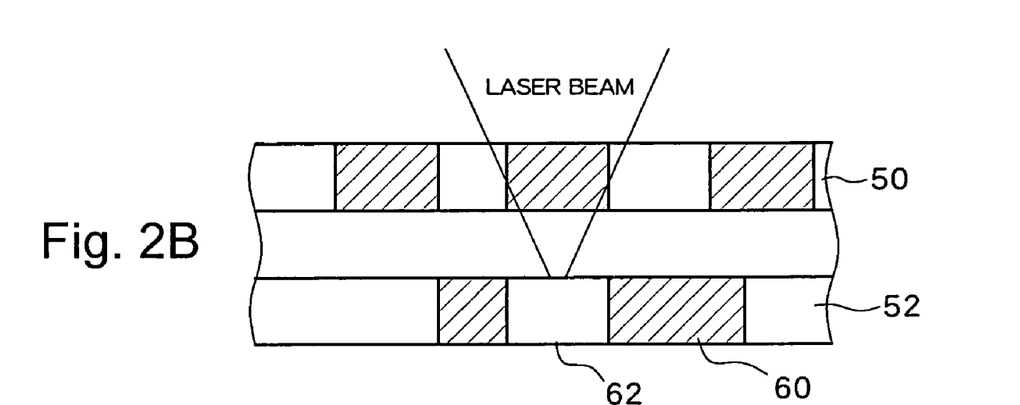
FIG. 2B is a view for explaining detection timing of an amount of return light at the time of data recording onto the second layer with the first layer in a recorded state.

FIGS. 2A and 2B show the first recording layer 50 and the second recording layer 52 of the optical disk 10. While both FIGS. 2A and 2B show data recording onto the second recording layer 52, FIG. 2A shows a case where the first recording layer 50 is in an unrecorded state and FIG. 2B shows a case where the first recording layer 50 is in a recorded state. In the present embodiment, it is assumed that the first recording layer 50 is formed by a material whose transmittance decreases as a result of data recording, as in the case of the related art described above, which may be Ge-Sb-Te described in the above-described publication of the related art, for example. In the case of FIG. 2(A), because the first recording layer is in the unrecorded state, the transmittance of the first recording layer 50 is relatively high and therefore the amount of laser beam which is transmitted through the first recording layer 50 and irradiated onto the second recording layer 52 is great. Consequently, the amount of light reflected by the second recording layer 52 and returning to the optical pickup 16 is relatively great. In the case of FIG. 2(B), on the other hand, because the first recording layer 50 is in the recorded state, the transmittance of the first recording layer 50 is relatively low, and therefore the amount of laser beam which is transmitted through the first recording layer 50 and irradiated onto the second recording layer 52 is small. Consequently, the amount of light reflected by the second recording layer 52 and returning to the optical pickup 16 is relatively small. Thus, it is possible to detect the amount of return light from the second recording layer 52 to thereby determine the level of transmittance of the first recording layer 50, i.e. whether the first recording layer 50 is in the unrecorded state or in the recorded state, in accordance with the amount of return light.

In this regard, however, because the amount of return light obtained at the time of forming a mark 60 in the second recording layer 52 can be varied in a complicated manner depending on the process of forming the mark 60 (specifically, the amount of return light is great when the mark 60 is not formed; the amount of return light gradually decreases during the formation of the mark 60; and the amount of return light is fixed to a low level when the formation of the mark 60 is completed), it is difficult to evaluate the level of the amount of return light at the time of mark formation. In order to deal with this problem, the amount of return light is sampled at the time when the data is recorded onto the second recording layer 52 and also a space 62, not the mark 60, is being formed in the second recording layer 52, and whether the first recording layer is in the recorded state or in the unrecorded state is determined in accordance with the level of the amount of return light at such a time.

Then, if it is determined that the first recording layer 50 is in an unrecorded state, the system controller 32 sets the recording power for the second recording layer 52 to an optimum recording power P2(NW) for the case where the first recording layer 50 is an unrecorded state. If it is determined that the first recording layer 50 is in a recorded state, on the other hand, the system controller 32 sets the recording power for the second recording layer 52 to an optimum recording power P2(W) for the case where the first recording layer 50 is a recorded state. Because the transmittance of the first recording layer 50 in the recorded state is lower than the transmittance of the first recording layer 50 in the unrecorded state, the relationship of P2(NW)<P2(W) is generally satisfied. The optimum recording powers P2(NW) and P2(W) are previously obtained prior to data recording onto the second recording layer 52 and stored in a memory of the system controller 32 or the like. Alternatively, it is also possible to obtain P2(NW) by the OPC and compute P2(W) by multiplying P2(NW) by a coefficient. At the time of data recording onto the second recording layer 52, the system controller 32 determines whether the first recording layer 50 is in the unrecorded state or in the recorded state, and performs switching control of the recording powers (laser beam intensities) for data recording onto the second recording layer 52 in accordance with the determination result. Consequently, the order of recording with respect to the first and second recording layers may be determined as desired. More specifically, it is possible to record data onto the second recording layer 52 first and then record data onto the first recording layer 50. Alternatively, it is also possible to record data onto the first recording layer 50 first and then record data onto the second recording layer 52, or record data on the first and second recording layers in an alternating manner, such as the second recording layer 52→the first recording layer 50→the second recording layer 52→the first recording layer 50→ . . . and so on.

Figure 3:
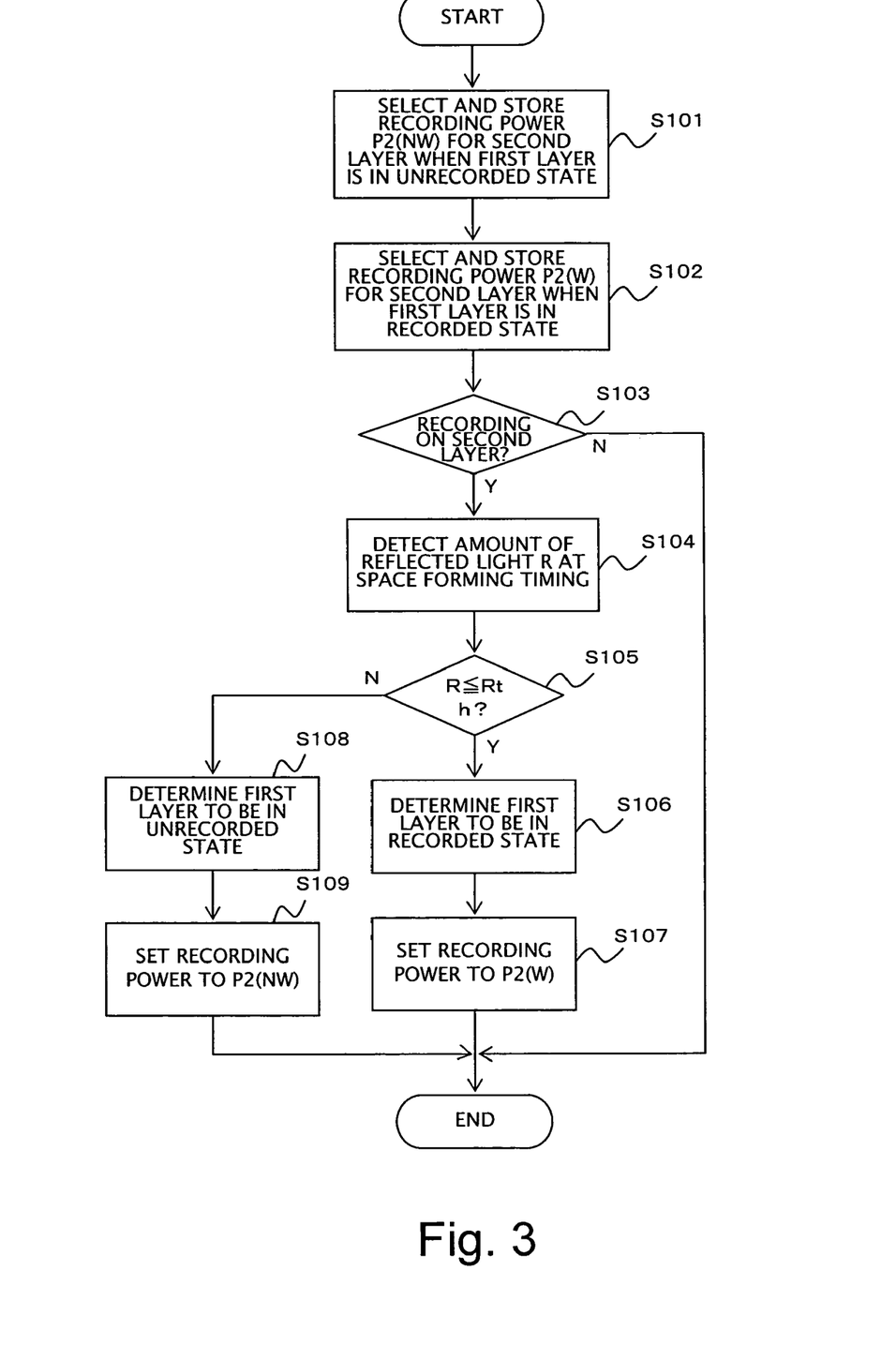
FIG. 3 is a flowchart showing the process according to the embodiment.

FIG. 3 is a flowchart showing the process according to the present embodiment. After the apparatus is activated, the system controller 32 performs OPC to select the optimum recording power P2(NW) for a case where the first recording layer 50 is in an unrecorded state and stores the P2(NW) in a memory (S101). For example, the test areas of the first and second recording layers are formed in different positions in the thickness direction of the optical disk, and OPC is sequentially performed with respect to the first and second recording layers to select the optimum recording power P2(NW) in the case where the first recording layer 50 is in an unrecorded state (the first recording layer always assumes an unrecorded state because the test areas do not overlap with each other in the first and second recording layers). It is of course possible to form the test areas in the first and second recording layers so as to partially overlap with each other and perform OPC in the non-overlapping region, thereby obtaining P2(NW).

Then, the system controller 32 performs OPC to thereby select the optimum recording power P2(W) for the second recording layer 52 for a case where the first recording layer 50 is in a recorded state and stores the recording power P2(W) in a memory (S102). The optimum recording power P2(W) can be selected by forming the test areas in the first and second recording layers 50 and 52 so as to partially overlap with each other and first performing OPC with regard to the first recording layer 50 in the overlapping region and then performing OPC with regard to the test area of the second recording layer 52 via the test area of the first recording layer 50 in which the test data has been recorded. It is of course possible to obtain a correction coefficient α from the ratio of transmittances of the first and second recording layers 50 and 52 and compute P2(W) from the equation P2(W)=α·P2(NW) (where α>1) in a manner similar to that in the above-described related art, and store the recording power P2(W) in a memory. The memory may be formed by a non-volatile flash memory or the like. It is of course possible to store the optimum recording power for the first recording layer 50 in the memory as well as the optimum recording power for the second recording layer 52. Thus, the optimum recording power P1 for the first recording layer 50 and the optimum recording powers P2(NW) and P2(W) for the second recording layer 52 are stored in the memory.

After the optimum recording powers P2(NW) and P2(W) are stored in the memory of the system controller 32 as described above, it is then determined whether or not recording onto the second recording layer 52 is requested by a write command from a host computer (S103). If data recording onto the second recording layer 52 is requested, the system controller 32 detects the amount of return light (the amount of reflected light) from the second layer 52 at the time of space formation, with regard to the data recording onto the second recording layer 52 (S104). Specifically, a reproduced signal obtained by the RF circuit 26 (i.e. a sum signal obtained by four sector photodetectors of the optical pickup 16) is sampled at the time of space forming, and the level of the amount of return light is detected. Here, the space forming time refers to a time at which the irradiated laser beam has a power other than the recording power, and may be the time of a reproducing power, for example. The default power at the time of data recording onto the second recording layer is set to the recording power P2(NW), for example, and the reproduced signal is sampled at the time of the reproducing power or the erase power, which is not the default power P2(NW). The detection of the amount of return light may be performed by the RF circuit 26 and the detection result may be supplied to the system controller 32. Specifically, the reproduced signal may be sampled at the space forming time in the stage preceding the stage of binarization by the binarization circuit 34 and the result may be supplied to the system controller 32.

After the amount of return light R at the space forming time is detected, the amount of return light R is compared with a threshold value Rth (S105). The threshold value Rth is set to a value between the amount of return light obtained when the first recording layer is in an unrecorded state and the amount of return light obtained when the first recording layer 50 is in a recorded state. The threshold value Rth can be prestored in the memory at the time of shipping from the factory, or can be obtained at the time of OPC and then stored in the memory. For example, in a state where the test areas of the first and second recording layers 50 and 52 partially overlap with each other in the thickness direction of the disk, OPC is first performed in the non-overlapping region with regard to each of the first and second recording layers 50 and 52, as a result of which the amount of return light from the second layer 52 at the space forming time during the OPC for the second recording layer 52 when the first recording layer is in an unrecorded state is detected. Subsequently, OPC is performed in the overlapping region with regard to each of the first and second recording layers 50 and 52, as a result of which the amount of return light at the space forming time during the OPC for the second recording layer 52 when the first recording layer is in a recorded state is detected. Then, the threshold value Rth is computed as an intermediate value between the two detected values. As a result of comparison between the amount of return light R and the threshold value Rth, if R≦Rth is satisfied, it is determined that the first recording layer 50 is in a recorded state (S106). If the first recording layer is determined to be in a recorded state, the system controller 32 sets the optimum recording power for the second recording layer 52 to P2(W) (S107). If R>Rth is satisfied, on the other hand, it is determined that the first recording layer 50 is in an unrecorded state (S108), and then the system controller 32 sets the optimum recording power with respect to the second recording layer 52 to P2(NW) (S109). Here, P2(W)>P2(NW). As described above, whether the first recording layer 50 is in the recorded state or the unrecorded state is first determined, and then the recording power for the second recording layer 52 is controlled in accordance with the determination result.

Here, while the size of a laser beam spot on the second recording layer 52 when recording data on the second recording layer 52 is about 1 μm, the size of a laser beam spot on the first recording layer 50 can be as large as about 20 to 30 μm. Consequently, if an unrecorded region and a recorded region are mixed in the first recording layer 50, rather than the entire region of the first recording layer 50 being in either unrecorded or recorded state, due to such a large spot size, the amount of return light can change continuously in the vicinity of the boundary between the unrecorded region and the recorded region. In such a case, it is also preferable to cause the optimum recording power for the second recording layer 52 to change continuously between P2(NW) and P2(W).

Figure 4:
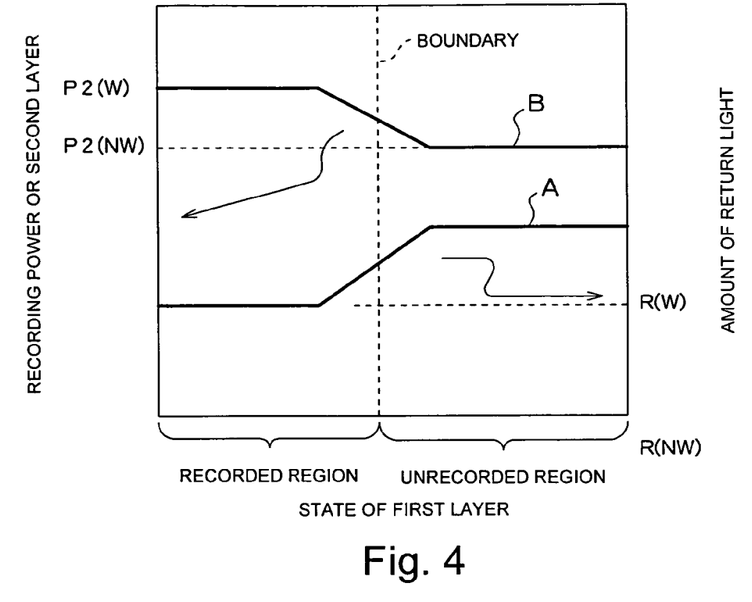
FIG. 4 is a view for explaining power setting in the vicinity of the boundary in the first layer.

FIG. 4 shows a change in the amount of return light and a change of the recording power for the second recording layer 52 when both the recorded region and the unrecorded region exist in the first recording layer 50. In FIG. 4, the horizontal axis shows the state of the first recording layer 50 in which the recorded state and the unrecorded state exist. The horizontal axis may represent the radial direction of the first recording layer 50 in which the recorded region exists on the inner radius side and the unrecorded region exists on the outer radius side. The vertical axis on the left side shows the optimum recording power for the second recording layer 52, and the vertical axis on the right side shows the amount of return light. Further, the graph A shows the amount of return light, and the graph B shows the recording power for the second recording layer 52. If a portion of the first recording layer 50 onto which the laser beam is irradiated is the recorded region, the amount of return light from the second recording layer 52 located further away from the laser beam incident side is R(W). Here, R(W) satisfies the relationship of R(W)<R(NW) with respect to the amount of return light R(NW) obtained when a portion of the first recording layer 50 onto which the laser beam is irradiated is the unrecorded region. In the boundary region between the recorded region and the unrecorded region, the amount of return light should rapidly change from R(W) to R(NW) if the laser beam is focused to a sufficient degree on the first recording layer 50. Actually, however, because the laser beam is not focused to a sufficient degree and is in a defocused state to make the boundary unclear, the amount of return light gradually changes in the vicinity of the boundary region. In FIG. 4, the amount of return light gradually increases towards the unrecorded region from the recorded region. When the amount of return light is R(W), as the relationship of R(W)≦Rth is satisfied, the recording power for the second recording layer 52 is set to P2(W). On the other hand, when the amount of return light is R(NW), as the relationship of R(NW)>Rth is satisfied, the recording power for the second recording layer 52 is set to P2(NW). In the boundary region, the amount of return light changes continuously and the difference between the amount of return light R and the threshold value Rth continuously decreases, though the levels of the amount of return light R and the threshold value Rth can still be compared. Accordingly, in the vicinity of the boundary region in which the amount of return light R changes continuously as described above, the recording power for the second recording layer 52 is also changed gradually in accordance with the change in the amount of return light R. In FIG. 4, the recording power is gradually decreased towards the unrecorded region from the recorded region. Thus, the optimum recording power is set similarly in the vicinity of the boundary region.

While the preferred embodiment of the present invention has been described, the present invention is not limited to the embodiment described above, and various changed may be made. For example, while the single threshold value Rth is used in the above example, two threshold values Rth1 and Rth2 (Rth1<Rth2) may be used taking into consideration the power setting in the vicinity of the boundary region. In this case, in the process flow shown in FIG. 3, the amount of return light R is compared to the two threshold values Rth1 and Rth2 at step S105. If R≦Rth1 is satisfied as a result of comparison, the first recording layer 50 is determined to be in the recorded state and the optimum recording power is set to P2(W). If R>Rth2 is satisfied, on the other hand, the first recording layer 50 is determined to be in the unrecorded state and the optimum recording power is set to P2(NW). Further, if Rth1<R≦Rth2 is satisfied, it is determined that the first layer 50 is the boundary region (the region in the vicinity of boundary) and the optimum recording power is set between P2(W) and P2(NW). Assuming that the optimum recording power in this case is P2(B), the relationship of P2(NW)<P2(B)<P2 (W) is satisfied. It is also preferable that, assuming P2(B) to be a function of R, P2(B)=P2(R) is obtained. P2(B) has a negative correlation with respect to R, and therefore P2(B) decreases as R increases.

Further, while in the above embodiment, the optimum recording power is changed continuously in the boundary region as shown in FIG. 4, the optimum recording power may be changed discontinuously or in a stepwise manner.

Also, while in the above embodiment the material whose transmittance decreases due to recording has been described as an example material for the recording layer, the present invention is also applicable to the case of a material whose transmittance increases due to recording. In this case, the relationships of R(W)>R(NW) and P2(W)<P2 (NW) are satisfied. This structure will be described with reference to the process flow chart shown in FIG. 3. If R≦Rth is determined at step S105, the first recording layer is determined to be in the unrecorded state and the recording power is set to P2(NW). If R>Rth is determined on the other hand, the first recording layer is determined to be in the recorded state and the recording power is set to P2(W). Further, if Rth1<R≦Rth2 is determined, it is determined that that the first layer 50 is the boundary region (the region in the vicinity of boundary), and the recording power is set between P2(NW) and P(W).

Further, while in the above embodiment, the optical disk having a two-layer structure including the first recording layer 50 and the second recording layer 52 has been described, the present invention is similarly applicable to an optical disk 10 having three or more recording layers. It is assumed that three recording layers in a three-layer optical disk are referred to as the first recording layer, the second recording layer, and the third recording layer sequentially from the side of a laser beam incident surface of the disk. In this case, when recording data onto the third recording layer, because the amount of return light detected at the space forming time changes depending on whether the first and second recording layers are in the recorded state or the unrecorded state, the recording power for the third recording layer can be changed in accordance with the amount of return light. In general, the recording power can be set to P2(W) if one of the first recording layer and the second recording layer is in the recorded state, and if both the first and second recording layers are in the recorded state, as the transmittances of these layers change accordingly, the recording power for the third recording layer can be changed in accordance with the change of the transmittances.

While the preferred embodiment of the present invention has been described using specific terms, such description is for illustrative purposes only, and it is to be understood that changes and variations may be made without departing from the spirit or scope of the appended claims.

What is claimed is:

1. An optical disk apparatus for recording data on an optical disk having at least a first layer and a second layer, comprising:
   detection means for detecting an amount of return light at a time of forming a space in the second layer when data is to be recorded on the second layer by a laser beam which has been transmitted through the first layer;

determination means for determining whether a portion of the first layer onto which the laser beam is irradiated is in an unrecorded state or a recorded state, in accordance with a level of the amount of return light; and power control means for setting, in accordance with a determination result by the determination means, a recording power for recording data on the second layer to a first recording power if the first layer is in the unrecorded state and setting the recording power to a second recording power which differs from the first recording power if the first layer is in the recorded state.

2. An optical disk apparatus according to claim 1, wherein a transmittance of the first layer decreases as a result of data recording, and the determination means determines the first layer to be in the recorded state if the amount of return light is equal to or less than a threshold value and determines the first layer to be in the unrecorded state if the amount of return light exceeds the threshold value.

3. An optical disk apparatus according to claim 1, wherein a transmittance of the first layer increases as a result of data recording, and the determination means determines the first layer to be in the unrecorded state if the amount of return light is equal to or less than a threshold value and determines the first layer to be in the recorded state if the amount of return light exceeds the threshold value.

4. An optical disk apparatus according to claim 1, wherein a transmittance of the first layer decreases as a result of data recording, and the second recording power is greater than the first recording power.

5. An optical disk apparatus according to claim 1, further comprising:

means for recording test data in a test area of the first layer and then recording test data using various recording powers in a test area of the second layer which is formed at a position different from the test area of the first layer in the thickness direction of the optical disk, thereby selecting an optimum recording power among the various recording powers to select the first recording power.

6. An optical disk apparatus according to claim 1, further comprising:

means for recording test data in a test area of the first layer and then recording test data using various recording powers in a test area of the second layer which is formed at a position overlapping the test area of the first layer in the thickness direction of the optical disk, thereby selecting an optimum recording power among the various recording powers to select the second recording power.

7. An optical disk apparatus according to claim 1, further comprising:

means for storing a correction coefficient $\alpha$ which is set in accordance with a ratio of transmittances of the first layer and the second layer; and means for computing the second recording power from the first recording power by means of the following expression using the correction coefficient $\alpha$:

the second recording power=$\alpha \times$the first recording power.

8. An optical disk apparatus according to claim 1, wherein a transmittance of the first layer increases as a result of data recording, and the second recording power is smaller than the first recording power.

9. An optical disk apparatus according to claim 1, further comprising:

means for recording data on the first layer and the second layer in a desired order using a recording power which is controlled by the power control means.

10. An optical disk apparatus for recording data on an optical disk having at least a first layer and a second layer, comprising:

detection means for detecting an amount of return light at a time of forming a space in the second layer when data is to be recorded on the second layer by a laser beam which has been transmitted through the first layer;

determination means for determining whether a portion of the first layer onto which the laser beam is irradiated is an unrecorded region, a recorded region, or a boundary region, in accordance with a level of the amount of return light; and power control means for setting, in accordance with a determination result by the determination means, a recording power for recording data on the second layer to a first recording power if the first layer is the unrecorded region, setting the recording power to a second recording power which differs from the first recording power if the first layer is the recorded region, and setting the recording power to a third recording power between the first recording power and the second recording power if the first layer is the boundary region.

11. An optical disk apparatus according to claim 10, wherein a transmittance of the first layer decreases as a result of data recording, and the determination means determines that the first layer is the recorded region if the amount of return light is equal to or less than a first threshold value, determines that the first layer is the unrecorded region if the amount of return light exceeds a second threshold value which is greater than the first threshold value, and determines that the first layer is the boundary region if the amount of return light is equal to or greater than the first threshold value and is equal to or less than the second threshold value.

12. An optical disk apparatus according to claim 10, wherein a transmittance of the first layer increases as a result of data recording, and the determination means determines that the first layer is the unrecorded region if the amount of return light is equal to or less than a first threshold value, determines that the first layer is the recorded region if the amount of return light exceeds a second threshold value which is greater than the first threshold value, and determines that the first layer is the boundary region if the amount of return light is equal to or greater than the first threshold value and is equal to or less than the second threshold value.

13. An optical disk apparatus according to claim 10, wherein a transmittance of the first layer decreases as a result of data recording, and the second recording power is greater than the first recording power.

14. An optical disk apparatus according to claim 10, wherein a transmittance of the first layer increases as a result of data recording, and the second recording power is smaller than the first recording power.

* * * * *